United States Patent [19]
Bloom et al.

[11] 3,877,045
[45] Apr. 8, 1975

[54] NOVEL PHOTOGRAPHIC FILM ASSEMBLIES

[75] Inventors: Stanley M. Bloom, Waban; James W. Foley, Andover; Nicholas S. Hadzekyriakides, Arlington, all of Mass.

[73] Assignee: Polaroid Corporation, Cambridge, Mass.

[22] Filed: Sept. 21, 1973

[21] Appl. No.: 399,321

[52] U.S. Cl. ............... 354/275; 354/76; 354/174; 354/202; 136/111
[51] Int. Cl. ......................................... G03b 17/50
[58] Field of Search ............ 354/83, 276, 202, 275, 354/174; 136/111, 179.1

[56] References Cited
UNITED STATES PATENTS

| | | | |
|---|---|---|---|
| 1,603,443 | 10/1926 | Benner | 136/179.1 |
| 2,465,202 | 3/1949 | Craig | 136/179.1 |
| 3,353,999 | 11/1967 | Osborn | 136/111 X |
| 3,543,662 | 12/1970 | Erlichman | 354/83 X |
| 3,563,805 | 2/1971 | Deierhoi, Jr. | 136/111 |

*Primary Examiner*—Richard M. Sheer
*Attorney, Agent, or Firm*—Robert M. Ford; Gerald L. Smith

[57] ABSTRACT

A photographic film assembly which comprises a cassette; a supply of photographic film disposed within the cassette; a battery positioned within the cassette which includes one or more cells containing an aqueous electrolyte possessing an ionizable ammonium salt, and gas collector means positioned within the cassette for capture of volatile effluvia liberated by the battery.

20 Claims, 2 Drawing Figures

PATENTED APR 8 1975 3,877,045

3,877,045

NOVEL PHOTOGRAPHIC FILM ASSEMBLIES

BACKGROUND OF THE INVENTION

The present invention is concerned with new and improved photographic film assemblies of the general type disclosed in U.S. Pat. No. 3,543,662 and the like.

As disclosed in the cited patent, in general, such photographic film assemblies comprise a cassette configured to retain a predetermined number of film units for selective sequential photoexposure and a flat or planar battery for powering various photographic camera instrumentalities for photographic employment of the film units.

Planar batteries of the type disclosed in U.S. Pat. Nos. 3,563,805; 3,617,387; 3,734,780; and the like are generally intended to be employed as an individual power source for portable electrically operated devices wherein the selected device design parameters are optimized by the availability and employment of a planar battery exhibiting reliability with respect to its power delivery characteristics. Specifically, batteries of the type in question presently are exclusively employed commercially to operate the various electrically powered systems of the photographic camera sold by Polaroid Corporation, Cambridge, Mass., U.S.A., under the trademark "SX-70". In such cameras, the battery, disposed as a component of a film pack for employment in and in combination with the camera, provides the electrical energy necessary to operate the camera's exposure control, film transport and photoflash systems and, accordingly, such battery is required to operate in a sequential series of power generating modes which may or may not be interrupted by more or less extended recovery and/or storage times and under which conditions to deliver the required series of high current pulses dictated by the photographic system design.

In present commercial employment, the planar batteries distributed comprise, in essence, primary batteries of the LeClanche type employing an aqueous electrolyte system which includes the conventional ionizable ammonium and mercury salt components of such type, e.g., ammonium chloride, the presence of which has a tendency to generate free ammonia gas liberated in the vicinity of such battery, and mercuric chloride, present to inhibit the generation of hydrogen derived from electrolyte attack on LeClanche type zinc constituted battery anode materials, which may liberate mercury in a gaseous phase in the vicinity of the battery. The exiting of volatile effluvia, e.g., of the type denoted, from the battery within the confines of a photographic film-retaining cassette has now been found to provide in many instances photographically deleterious effects to the predetermined sensitometric properties of photographic film residing in the environment of the volatile effluvia as, for example, photographic film speed and balance shifts.

SUMMARY OF THE INVENTION

The present invention is directed to a new and improved photographic film assembly which comprises, in combination, a photographic film cassette including a withdrawal orifice positioned in a wall of the cassette through which a supply of photographic film is adapted to be selectively withdrawn; a supply of photographic film positioned within the cassette for selected withdrawal from the cassette through the orifice; a battery positioned within the cassette and including, in combination, an anode, a cathode superposed coextensive the anode, a separator positioned intermediate and extending coextensive the facing surfaces of the anode and the cathode, and an electrolyte, containing an ammonium salt and/or mercuric chloride, disposed in contact with the facing surfaces of the anode and the cathode; and gas collector means disposed in the cassette for capture of ammonia, water or mercury vapor, or other volatile effluvia liberated by the battery.

DETAILED DESCRIPTION OF THE INVENTION

As disclosed in previously mentioned U.S. Pat. No. 3,543,662, a film pack or cassette for photographic cameras may be configured to retain a number of film units for selective sequential exposure and a flat or planar battery assembly for powering various photographic camera instrumentalities for employment of the film units.

Figure 1:
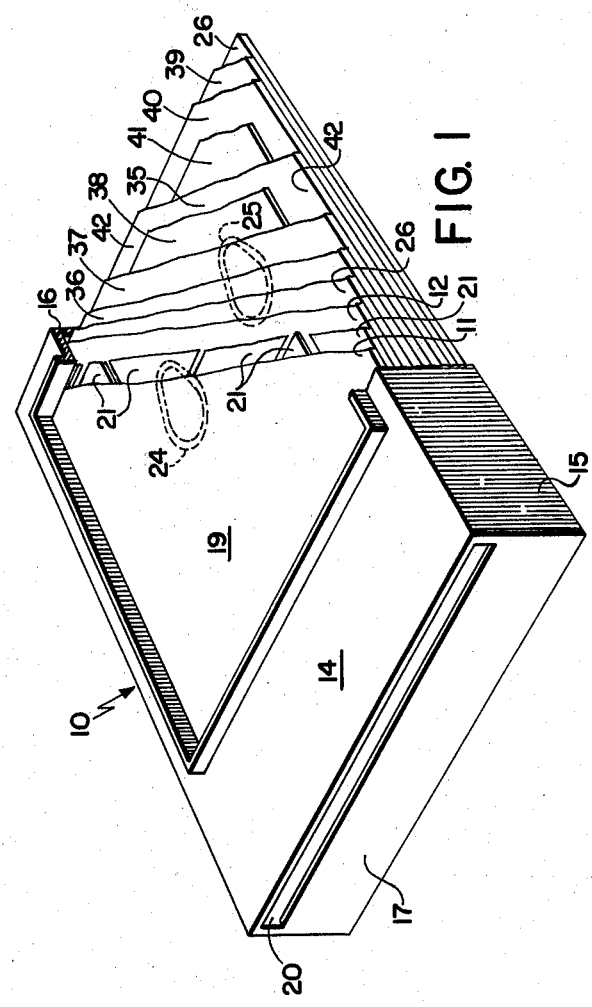
FIG. 1 is a fragmentary perspective view of one embodiment of a photographic film assemblage in accordance with the present invention and including the cassette, photographic film units, spring biasing member, ammonia gas collector, and battery constituting the assembly.
Figure 2:
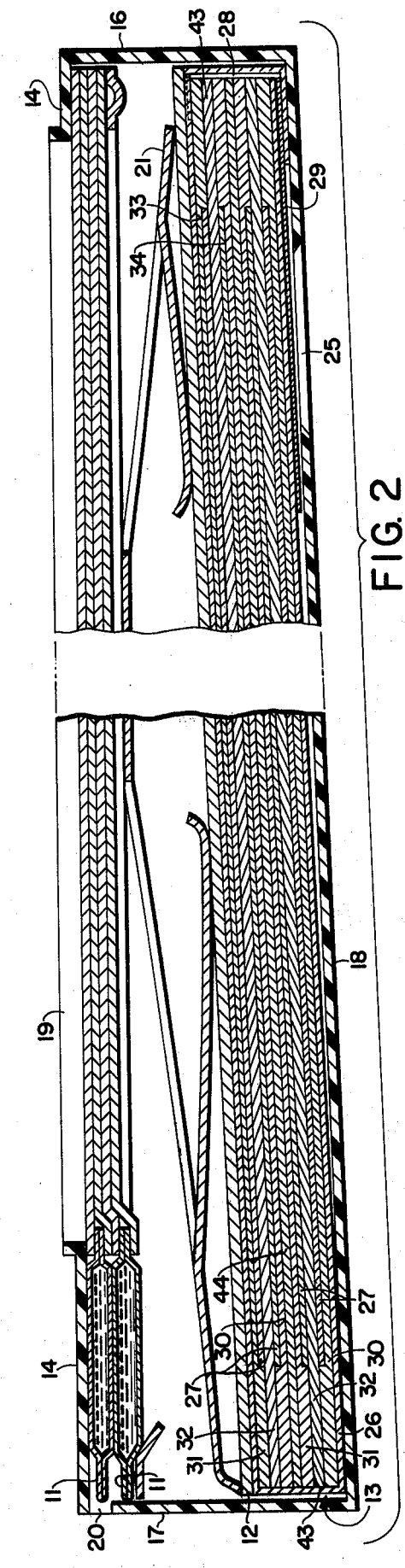
FIG. 2 is a diagrammatic enlarged cross-sectional view of the film assemblage of the type set forth in FIG. 1, along section line 2—2, illustrating the association of elements comprising the photographic film assemblage.

As seen by reference to FIGS. 1 and 2, the cassette may comprise a generally parallelepiped container or box 10 for holding and enclosing a plurality of film units 11, gas collector means 12 and a planar battery assemblage 13. Container 10 is shown as comprising a forward wall 14, side walls 15, a trailing end wall 16, a leading end wall 17, and a rear wall 18 and may be formed of a resilient plastic material. Forward wall 14 is provided with a generally rectangular exposure aperture 19 for transmitting light for exposing film units 11 carried within container 10. Leading end wall 17 is provided with a generally rectangular slot or exit orifice to provide a passage 20 at the leading end of the container through which film units 11 carried by the container are adapted to be individually withdrawn. Container 10 may additionally be provided with a dark slide or cover sheet (not shown) of any suitable opaque material such as paper or plastic sheet material positioned between the forwardmost film unit 11 and aperture 19 to serve as a light seal and which may be removed through withdrawal slot 20 once container 10 is located in its operative position within a camera apparatus.

The stack arrangement within container 10 of a plurality of film units 11 (one shown in FIG. 1 and two are shown in FIG. 2) and gas collector 12 is specifically illustrated in FIG. 2. Each film unit 11 is arranged in overlying relationship with its exposure surface facing in the direction of exposure aperture 19.

As disclosed in aforementioned U.S. Pat. No. 3,543,662, the cassette additionally includes a spring-loaded platform 21 positioned between gas collector 12 and next adjacent film unit 11 for compressively retaining the battery terminals next adjacent cassette terminal ports 24 and 25 for interengagement with camera electrical leads, and for biasing film units 11 in the direction of exposure aperture 19.

The completed film cassette assemblage including film units 11, spring member 21, collector 12 and battery 13 shown in FIGS. 1 and 2 is adapted for direct employment in camera devices of the type previously mentioned and disclosed in detail in U.S. Pat. Nos. 3,643,565; 3,714,879; and the like.

Film unit 11 may be advantageously constructed in accordance with the disclosure of any of U.S. Pat. Nos. 3,594,165; 3,689,262; 3,672,890; or the like.

Specifically preferred film units of the types disclosed in the last-mentioned U.S. patents comprise integral negative positive color diffusion transfer process film units which include, in combination, a photosensitive silver halide layer having associated therewith a diffusion transfer process dye image-forming material adapted to diffuse a diffusion transfer process image-receiving layer as a function of the point-to-point degree of exposure and processing of the photosensitive silver halide layer; a diffusion transfer process image-receiving layer adapted to receive dye image-forming material diffusing thereto to provide dye transfer image formation, and an opaque layer disposed intermediate the photosensitive silver halide layer and the image-receiving layer against which the dye transfer image in the reception layer may be viewed subsequent to formation.

As disclosed in U.S. Pat. No. 3,672,890 a composite photosensitive structure, particularly adapted for reflection type photographic diffusion transfer color process employment, which comprises a plurality of essential layers including, in sequence, a dimensionally stable layer preferably opaque to incident radiation; one or more silver halide emulsion layers having associated therewith a diffusion transfer process dye image-providing material; a polymeric layer adapted to receive solubilized dye image-providing material diffusing thereto; and a dimensionally stable transparent layer, may be exposed to incident actinic radiation and processed by interposing, intermediate the silver halide emulsion layer and the reception layer, a processing composition and an opacifying agent, which may reflect incident radiation, in a quantity sufficient to mask dye image-providing material associated with the silver halide emulsion.

In a preferred embodiment, the composite photosensitive structure includes a rupturable container, retaining an alkaline processing composition and the opacifying agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition, distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually mobilized as a function of the point-to-point degree of the respective silver halide emulsion layer's photoexposure, resulting in imagewise distributions of mobile dye image-providing materials adapted to transfer, by diffusion, to the reception layer to provide the desired transfer dye image. Subsequent to substantial dye image formation in the reception layer, means associated with composite structure are adapted to convert the pH of the film unit from a first processing pH at which dye image-providing material is diffusible as a function of the film unit's photoexposure to a second pH at which the transfer dye image exhibits increased stability, preferably a sufficient portion of the ions of an alkaline processing composition transfers, by diffusion, to a polymeric neutralizing layer to effect reduction in the alkalinity of the composite film unit from a first alkaline processing pH to the second pH at which dye image-providing material is substantially nondiffusible, and further dye image-providing material transfer is thereby substantially obviated.

The transfer dye image is viewed, as a reflection image, through the dimensionally stable transparent layer against the background provided by the opacifying agent, distributed as a component of the processing composition, intermediate the reception layer and next adjacent silver halide emulsion layer. The thus-formed opacifying stratum effectively masks residual dye image-providing material retained in association with the silver halide emulsion layer subsequent to processing.

In U.S. Pat. No. 3,415,644, the dimensionally stable layer of the film unit next adjacent the photosensitive layer or layers is disclosed to be opaque, the opacifying agent is initially disposed in an aqueous alkaline processing composition and the film unit's pH modulating means are disclosed to comprise a polymeric layer disposed intermediate the dimensionally stable transparent layer and the reception layer and adapted to reduce, subsequent to substantial dye transfer image formation, the pH of an aqueous alkaline processing composition from a first processing pH at which the dye image-forming material or materials are soluble and diffusible in the composition as a function of the photoexposure of the photosensitive silver halide layer associated therewith to a second pH at which the dye image-forming material or materials are substantially nondiffusible and, as disclosed in U.S. Pat. No. 3,415,646, the dimensionally stable layer of the film unit next adjacent the photosensitive silver halide layer or layers may be transparent to incident actinic radiation and, as further disclosed in U.S. Pat. No. 3,415,645, in such instance the opacifying agent may be initially disposed in the film unit intermediate the reception layer and next adjacent silver halide layer.

As disclosed in U.S. Pat. Nos. 3,615,421 and 3,661,585, the opacifying component of the film unit may optionally be initially disposed as a preformed processing composition permeable layer, intermediate the reception layer and next adjacent silver halide layer, in a concentration which prior to photoexposure is insufficient to prevent transmission therethrough of exposing actinic radiation and which, subsequent to processing, possesses an opacifying capacity effective to mask residual dye image-providing material retained associated with the film unit's silver halide emulsion layers, and in U.S. Pat. No. 3,647,435, the opacifying component of the film unit may optionally be initially formed in situ, intermediate the reception layer and next adjacent silver halide layer, during photographic processing of the film unit.

In U.S. Pat. No. 3,647,437, the opacifying component is disclosed to optionally comprise a light-absorbing reagent such as a dye which is present as an absorbing species at the first pH and which may be converted to a substantially non-absorbing species at the second pH, and in U.S. Pat. Nos. 3,473,925; 3,573,042 and 3,576,626, opacifying and reflecting component, respectively, may be individually interposed intermediate the silver halide layer and reception layer by selective distribution from a composite or a plurality of rupturable containers.

In U.S. Pat. No. 3,573,043, the polymeric neutralizing layer is disclosed to be optionally disposed intermediate the dimensionally stable opaque layer and next adjacent essential layer, i.e., next adjacent silver halide/dye image-providing material component, to effect the designated modulation of film unit's environmental pH; U.S. Pat. No. 3,576,625 discloses the employment of particulate acid distributed within the film unit to effect the modulation of the environmental pH, and U.S. Pat. No. 3,573,044 discloses the employment of processing composition solvent vapor transmissive dimensionally stable layers to effect process modulation of dye transfer as a function of solvent concentration.

Where desired, the film unit may also be constructed in accordance with the disclosure of U.S. Pat. Nos. 3,594,164; 3,594,165; 3,689,262 and 3,701,656 to comprise a composite photosensitive structure including a transparent dimensionally stable layer carrying a reception layer, a processing composition permeable opaque layer and a photosensitive silver halide layer and the film unit may include a separate dimensionally stable sheet element adapted to be superposed on the surface of the photosensitive structure opposite the dimensionally stable layer and may further include means such as rupturable container retaining processing composition for distribution of a processing composition intermediate the sheet and photosensitive structure to effect processing. As further disclosed in certain of the last-cited patents and applications, in structures wherein the receptor is positioned next adjacent the transparent layer or the processing composition and/or the sheet is to be separated from the remainder of the film unit subsequent to processing, the latter elements may optionally include opacifying component.

As disclosed in U.S. Pat. No. 3,620,724, the dimensionally stable layer referred to may be opaque and in which instance the photosensitive silver halide layer is positioned next adjacent the opaque support layer and the opacifying component of the film unit's processing composition permeable opaque layer will be disposed in the unit in a concentration insufficient to prevent transmission therethrough of exposing actinic radiation and which, subsequent to processing, possesses an opacifying capacity effective to mask residual dye image-providing material retained associated with the silver halide layer, and as disclosed in U.S. Pat. No. 3,647,434, the opacifying agent may be optionally formed in such film unit, in situ, during processing of the unit.

In accordance with the present invention, the preferred form of the battery to be employed comprises one or more planar electrical energy cells disposed in the photographic film cassette, each cell in series relationship and including superposed planar anode and cathode elements having disposed between their facing surfaces a separator possessing an electrolyte permeable central portion or section surrounded by substantially electrolyte-free marginal portions. Aqueous electrolyte is disposed in the central section and in contact with the facing surfaces of both the anode and cathode, and an electrically nonconducting thermoplastic sealant is disposed sealing the marginal surfaces of the battery and providing an aqueous electrolyte impermeable seal between the marginal portions of the separator and the next adjacent facing anode and cathode surfaces to prevent escape of the aqueous electrolyte from its spacial location within the electrical energy generating components of the cell.

Referring to the drawings, there is shown in perspective in FIG. 1 and in cross-section in FIG. 2, specified batteries or energy cells employed in the practice of the present invention.

As shown in FIGS. 1 and 2, battery 13 may include envelope or container 26 retaining the superposed electrical energy generating components of the battery disposed within, for example, an electrically nonconducting, vapor-impervious thermoplastic envelope extending around and coextensive the external or exterior surfaces of generating components. Envelope 26 acts to encapsulate the energy components to prevent escape of aqueous electrolyte 27 and/or electrolyte solvent vapor from its predetermined spacial location within battery 13's structure.

Electrical leads 28 and 29, respectively, extend from the interior of the battery and, specifically, individually from cathode or positive electrode 30 and from anode or negative electrode 31 of battery 13 for electrical interconnection with the intended device to be powered by the cell.

As seen by reference to FIGS. 1 and 2, the electrical energy generating components of battery 13 comprise, in essence, planar anode 31 in superposed relationship with planar cathode 30 having separator 32 disposed intermediate facing surfaces 33 and 34, respectively, of anode 31 and cathode 30, within the confines of envelope 26. Aqueous electrolyte 27 is disposed in the central portion 35 of separator 32 and in contact with each of facing surfaces 33 and 34.

In the preferred embodiment, the battery will ordinarily comprise a LeClanche electrochemical system including a zinc negative or anode system 31 and a manganese dioxide positive or cathode system 30. The aqueous electrolyte 27 will generally comprise an aqueous ammonium chloride, zinc chloride electrolyte and, in an addition, a small amount of mercuric chloride which will be disposed between and in contact with the facing surface of each of the anode oand the cathode and in contact and impregnated into electrolyte permeable central portion 35 of separator 27.

As shown in FIG. 1, the preferred anode 31 may itself advantageously comprise, in combination, a composite structure including metallic sheet current collector plate 36 preferably an aluminum, lead or steel sheet material on the order of less than 10 mils in thickness; polymeric current collector 37 preferably a sheet of electrically conductive carbon impregnated vinyl film sold under the trade designation "Condulon" possessing the same relative external dimensions as the anode and in order of about 7 mils in thickness, and a distribution of active zinc negative material 38 either as a zinc paste carried on the conductive polymeric collector 37 or active sheet zinc secured to collector 37, in each instance amalgamated in the conventional manner as, for example, with mercury by contact with mercuric chloride.

The preferred cathode 30 may itself comprise a metallic sheet current collector plate 39 analogous in construction to collector 36; polymeric current collector 40 also analogous in construction to collector 37, and active positive material 41 as a cathodic paste deposition on collector 40, for example, the maganese dioxide/ electrically conductive carbon mixture dispersed in a polymeric binder which is employed in the manner conventional in the battery art.

Electrolyte 27 will ordinarily comprise a conventional aqueous ammonium chloride/zinc chloride about 4:1 dispersed in a polymeric binder such as hydroxyethyl cellulose, polyacrylamide, etc., for example, on the order of about 5 or more percent applied to and impregnated in central portion 35 of separator 32 and in contact with the facing surfaces of active positive material 30 and active negative material 31. In addition, as previously mentioned, a small quantity of mercuric chloride will be present in the electrolyte as a corrosion inhibitor for the zinc anode system.

In general, marginal portions 42 of separator 19 will be maintained free of electrolyte 27 and may be coated on each surface with and impregnated by a thermal sealing adhesive such as a polymeric hot melt adhesive, for example, a conventional hot melt vinyl adhesive, adapted to secure the separator to the anode and cathode, respectively, for example, marginal sections 42 of separator 27 to the facing marginal sections of polymeric collectors 37 and 40.

Separator 32 may be readily constructed of and comprise a conventional battery separator material such as aqueous electrolyte permeable fibrous sheet materials, for example, microporous paper, kraft papers and polymeric sheet materials such as woven polyester sheet, etc.

As illustrated by FIG. 2, the battery itself may comprise a multicell structure preferably arranged and constructed with the cells of the battery in superposed or stacked configuration and in electrical series relationship; the number of such cells determined by the power output of each cell and the power requirements of the device to be energized by the battery.

As shown in FIG. 2, intermediate each cell 43 there is located intercell connector 44 which in a preferred embodiment will comprise polymeric sheet material of the type described above with reference to current collectors 37 and 40 and upon opposed surfaces there may be secured the respective anode and cathode compositions of the opposed cells.

The capacity of each of the primary battery cells as described will vary substantially in proportion to the areas of their active surfaces. Typically, one such cell will produce about 0.10 to 0.15 amperes per square inch of surface area while yielding about 1.5 volts. For popular photographic camera sizes, an area within each film cassette available for retaining the batteries will provide about 10 to 12 square inches of practical surface. It follows, therefore, that the battery capacity desired for a film supply-power source combination readily may be varied through the simple expedient of combining a select number of discrete cells of predetermined dimension.

While it is preferred to employ the aforementioned LeClanche electrochemical system (comprising manganese dioxide positive active material, zinc negative active material, and an electrolyte comprising ammonium chloride and zinc chloride), the battery may employ a wide variety of positive and negative electrode materials and a wide variety of electrochemical systems including both primary and secondary systems which employ an ionizable ammonium salt electrolyte component.

As illustrated in FIGS. 1 and 2, the gas collector employed may comprise a planar sheet structure or member 12 adapted to capture ammonia gas, water or mercury vapor or other volatile effluvia liberated or released from battery 13 by the evaporation and/or decomposition of electrolyte 27 to prevent photographically deleterious action of the effluvia on the photographic sensitometry of film units 11 disposed in cassette 10.

Collector 12 may itself readily comprise a metal salt adapted to form an ammoniate, i.e., an ammonia addition compound structurally analogous to a hydrate, upon contact with ammonia, preferably a transition metal salt adapted to form an ammoniate upon such contact and most preferably a transition metal salt the cation of which is $Fe^{++}$, $Ni^{++}$, $Mn^{++}$ or $Cu^{++}$. Although an anion of such salt may comprise any anion which does not interfer with the efficient and effective formation of the ammoniate, in general, simple anions readily available commercially as a component of the preferred salts may comprise $Cl^-$, $Br^-$, $I^-$ or $SO_4^=$.

Collector 12 may be constructed by disposition of the metal salt within a gas permeable and preferably adsorbent fibrous matrix such as blotting or filter paper, as, for example, by contacting or dipping such matrix with a solution of the metal salt which may be aqueous to impregnate the carrier matrix and removing the solvent. Where desired, the collector may also be constructed by coating an ammonia gas permeable and preferably adsorbent layer containing the salt on a dimensionally stable support, preferably a gas permeable and adsorbent support. Such coating may be accomplished employing any of the conventional coating or casting techniques available in the art and the coating composition may readily comprise a dispersion of the selected salt in a gas permeable polymeric matrix such as, for example, gelatin, polyvinyl alcohol, polyacrylamide, hydroxyethyl cellulose, or the like.

In a particularly preferred embodiment of the present invention, the metal salt adapted to form an ammoniate upon contact with ammonia will be disposed in intimate admixture with the selected gas adsorbent matrix and most preferably in admixture, and particularly surface contact, with a dispersion of a gas adsorbent possessing maximum active surface area. Specifically preferred adsorbents will comprise a particulate dispersion of, for example, gas adsorbent carbon black, alumina, silica gel, and the like and particularly those gas adsorbents which possess a high water vapor adsorption or absorption capacity and efficiency per unit weight and extensive active surface area.

In general, the concentration of salt and/or adsorber employed will be that necessary to insure collection and capture of the maximum amount of ammonia, water and mercury vapor, and other effluvia theoretically capable of liberation from the battery employed in the specific construction of the film assembly design selected.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assembly which comprises, in combination:
   a. a photographic film cassette including a withdrawal orifice positioned in a wall of the cassette through which a supply of photographic film is adapted to be selectively withdrawn;
   b. a supply of photographic film positioned in the cassette for selective withdrawal from the cassette through the orifice;
   c. a battery incorporating electrochemically active components and positioned in the cassette, including, in combination:
      i. an anode;
      ii. a cathode superposed substantially coextensive the anode;
      iii. a battery separator positioned intermediate and extending at least coextensive the facing surfaces of the anode and the cathode; and
      iv. an electrolyte disposed in contact with the facing surfaces of the anode and the cathode and including an ammonium salt; and
   d. gas collector means positioned in the cassette, externally of said electrochemically active components, for capture of volatile effluvia exiting from the battery.

2. A photographic film assembly as defined in claim 1 wherein the gas collector means is adapted to collect ammonia and is positioned in the cassette for capture of ammonia exiting from the battery.

3. A photographic film assembly as defined in claim 2 wherein the gas collector means comprises a metal salt adapted to form an ammoniate upon contact with ammonia.

4. A photographic film assembly as defined in claim 3 wherein the metal salt comprises a transition metal salt adapted to form an ammoniate upon contact with ammonia.

5. A photographic film assembly as defined in claim 4 wherein the cation of the transition metal salt is selected from the group consisting of $Fe^{++}$, $Ni^{++}$, $Mn^{++}$, and $Cu^{++}$.

6. A photographic film assembly as defined in claim 5 wherein the anion of the transistion metal salt is selected from the group consisting of $Cl^-$, $Br^-$, $I^-$ and $SO_4^=$.

7. A photographic film assembly as defined in claim 3 wherein the metal salt is disposed in an ammonia permeable fibrous matrix adapted to adsorb water vapor.

8. A photographic film assembly as defined in claim 3 wherein the metal salt is disposed in an ammonia permeable polymeric matrix adapted to adsorb water vapor.

9. A photographic film assembly as defined in claim 8 wherein the polymeric matrix comprises a coating carried on a dimensionally stable coating support member.

10. A photographic film assembly as defined in claim 1 wherein the gas collector means comprises a metal salt adapted to form an ammoniate upon contact with ammonia gas in intimate admixture with a particulate dispersion of a water vapor adsorbent.

11. A photographic film assembly as defined in claim 10 wherein the water vapor adsorbent is selected from the group consisting of ammonia and water vapor adsorbent carbon black, alumina and silica gel.

12. A photographic film assembly as defined in claim 11 wherein the metal salt comprises a transition metal salt adapted to form an ammoniate upon contact with ammonia in intimate surface contact with a particulate dispersion of carbon black adapted to adsorb ammonia and water vapor.

13. A photographic film assembly as defined in claim 12 wherein the transition metal salt is selected from the group consisting of ferrous chloride and ferrous sulfate.

14. A photographic film assembly which comprises, in combination:
   a. a photographic film cassette adapted for enclosing a plurality of photographic film units arranged in stacked relationship and including a forward wall possessing a light-transmitting section to permit exposure of the forwardmost film unit and a withdrawal opening in one wall of the container permitting selective withdrawal of the film units following exposure thereof;
   b. a plurality of photographic film units disposed in stacked relationship within the cassette next adjacent the forward wall;
   c. a battery positioned in the cassette and including, in combination:
      i. an anode;
      ii. a cathode superposed substantially coextensive the anode;
      iii. a battery separator positioned intermediate and extending at least coextensive the facing surfaces of the anode and the cathode; and
      iv. an electrolyte disposed in contact with the facing surfaces of the anode and the cathode and including an ionizable ammonium salt; and
   d. gas collector means positioned in the cassette intermediate the battery and the film units for capture of volatile effluvia exiting from the battery.

15. A photographic film assembly as defined in claim 14 wherein the cassette includes spring means biasing the film units towards the forward wall and the battery toward the rear wall.

16. A photographic film assembly as defined in claim 15 including first and second openings in the rear wall of the cassette, the first opening to permit conductor contact with the anode or cathode next adjacent the rear wall and the second opening to permit conductor contact with a conductor disposed in the container in contact with the electrode distal the rear wall.

17. A photographic film assembly as defined in claim 15 including at least one opening in a wall of the cassette to permit conductor contact with each of the anode and the cathode.

18. A photographic film assembly as defined in claim 14 wherein each of the photographic film units comprises an integral negative positive color diffusion transfer process film unit.

19. A photographic film assembly as defined in claim 18 wherein each of the color diffusion transfer process film units includes, in combination, a photosensitive silver halide layer having associated therewith a diffusion transfer process dye image-forming material adapted to diffuse to a diffusion transfer process image-receiving layer as a function of the point-to-point degree of exposure and processing of the photosensitive silver halide layer; a diffusion transfer process image-receiving layer adapted to receive dye image-forming material diffusing thereto to provide dye transfer image formation, and means for providing an opaque layer disposed intermediate the photosensitive silver halide layer and the image-receiving layer against which the dye transfer image may be viewed subsequent to formation in the image-receiving layer.

20. A photographic film assembly as defined in claim 14 wherein the gas collector means comprises a gas adsorbent matrix adapted to capture ammonia and water vapor contacted therewith.

* * * * *